United States Patent Office 3,443,969
Patented May 13, 1969

3,443,969
METHOD FOR PREPARING CONDIMENTS FROM YEASTS
Nobuo Nakajima, Nishinomiya, Koichi Miyata, Fuse, Shyozo Wada, Minoo, and Hirao Shimazono, Nishinomiya, Japan, assignors to Takeda Chemical Industries, Ltd., Osaka, Japan
No Drawing. Filed Mar. 11, 1966, Ser. No. 533,439
Claims priority, application Japan, Mar. 15, 1965, 40/15,133
Int. Cl. A23l 1/22
U.S. Cl. 99—140                    7 Claims

ABSTRACT OF THE DISCLOSURE

Method for preparing condiments containing 5'-nucleotides by treating yeast with an enzymatic system capable of hydrolyzing nucleic acid into 5'-nucleotides at pH 8.0–11.0 and an enzymatic system capable of solubilizing organic materials at pH 2.5–7.0 both enzymatic systems originating from a microorganism of the genus Trametes.

---

This invention relates to a method for preparing condiments from yeasts, more particularly, to a method for preparing condiments containing 5'-nucleotides by treating yeasts with two kinds of enzymatic systems produced by incubating certain microorganisms.

So far known methods for preparing from yeasts condiments containing 5'-nucleotides comprise subjecting raw yeast cells to autolyzation, extracting so-processed matter with a suitable solvent and purifying the extract. These methods, however, entail such drawbacks as that yields of the objective condiments relative to the yeasts employed as the starting material is relatively small and that the resultant condiments are weak in their enhancement of the deliciousness or flavor of foodstuff because of the very small amount of 5'-nucleotides formed in the condiments.

The present invention is based on the following observations:

(1) Microorganisms of the genus Trametes can produce (a) an enzymatic system capable of hydrolyzing nucleic acid into 5'-nucleotides at a pH value of about 8.0 to about 11.0 (hereinafter abbreviated as "Enzymatic System A") as well as (b) an enzymatic system capable of solubilizing organic materials at a pH value of about 2.5 to about 7.0 (hereinafter abbreviated as "Enzymatic System B").

(2) When yeasts are treated first with Enzymatic System A and then with Enzymatic System B in an aqueous medium at an optimal pH, followed by collection of the resultant liquid portion, a condiment containing a relatively large amount of 5'-nucleotides is obtained.

The object of this invention is to provide a yeast-originated condiment containing a relatively large amount of 5'-nucleotides, and another object is to provide a method for preparing same in a good yield.

These objects are realized by treating yeast first with Enzymatic System A produced by microorganisms of the genus Trametes and capable of hydrolyzing nucleic acid into 5'-nucleotides in an aqueous medium at a pH value of about 8.0 to about 11.0 and subsequently with Enzymatic System B produced by said microorganisms and capable of solubilizing organic materials in an aqueous medium at a pH value of about 2.5 to about 7.0.

The starting material for preparing the condiment of this invention may be any kind of yeast, such as brewery yeast, bakery yeast, bottom yeast, top yeast, chinese yeast, wine yeast and food yeast.

Examples of microorganisms of the genus Trametes which can be used in this invention are as follows:

*Trametes purpurea* Cooke
*Trametes Kusanoana* Imaz.
*Trametes malicola* Berk. et Curt.
*Trametes cinnabarina* (Jacq.) Fr.
*Trametes sanguinea* (L. ex Fr.) Lloyd
*Trametes suaveolens* (L.) Fr.
*Trametes albida* (Fr.) Bourd. et Galz.
*Trametes heteromorpha* (Fr.) Lloyd
*Trametes torgii* Berk.
*Trametes palisoti* (Fr.) Imaz.
*Trametes acuta* (Bark.) Imaz.
*Trametes serpens* Fr.
*Trametes sendaiensis* Yas.
*Trametes muelleri* Berk.
*Trametes hispida* Bagl.
*Trametes ljubarskyi* Pilat
*Trametes aneba* (Berk.) Imaz.

Microorganisms are sometimes known by two or more different names but the names of the microorganisms referred to in this specification are based on the system shown in "Mycological Flora of Japan" by Seiya Ito, published by Yokendo, Tokyo, in 1959.

The microorganisms can be incubated in a liquid or solid medium. In general, the use of a liquid medium is preferable for the preparation of Enzymatic Systems A and B on an industrial scale. In most cases, it is preferable to subject microorganisms of the genus Trametes to submerged cultivation. Generally, the microorganisms of the genus Trametes are cultured under stationary or shaken conditions or under aeration.

The culture medium should contain carbon and nitrogen sources which are assimilable by the microorganisms of the genus Trametes. Examples of assimilable carbon sources are starch, dextrin, sucrose, lactose, maltose, glucose and glycerol. Examples of assimilable nitrogen sources are such inorganic or organic nitrogen-containing materials as ammonium salts, various kinds of nitrates, cornsteep liquor, peptone, polypeptone, meat extract, soybean cake, soybean flour, wheat flour, yeast extract, urea or various amino acids. In addition, mineral salts such as calcium salts, magnesium salts, potassium salts, sodium salts, zinc salts, copper salts or iron salts, vitamins or growth-promoting factors may be added to the culture medium as accessory nutrients.

The conditions of incubation should be controlled so as to make the amount of Enzymatic Systems A and B maximum. Such conditions as the pH value of the medium, incubation temperature and incubation period may vary with the kind of microorganisms, components of medium, etc. In most cases, the incubation is desirably carried out at a temperature of 15–35° C. and the accumulated Enzymatic Systems A and B in the culture broth reach a maximum usually after several ten hours to several hundred hours. The preferable pH value of the medium is generally 3.6–6.0.

Under the above-mentioned culture conditions, Enzymatic Systems A and B are produced and accumulated in the culture broth. More concretely, Enzymatic System B is mainly accumulated in the culture filtrate, and it is composed of many kinds of enzymes, e.g. cellulase, CMC-ase, hemicellulase, protease, peptidase, glucanase, RNA-depolymerase, sucrase, maltase, lactase, xylanase, insulase, dextranase, mannase, α-amylase, β-amylase, lipase, pectinase and cellobiase, and shows a strong effect in solubilizing organic materials at pH about 2.5 to 7.0 and at a temperature of about 30° C. to about 70° C.

The accumulated Enzymatic System B may be recovered from the culture broth. Generally-known means for recovering enzymes from their solution can be applied to the recovering of Enzymatic System B. Enzymatic System B can be adsorbed on various adsorbents or precipitated by some precipitants. Moreover, general means for recovery such as precipitation near the isoelectric point, salting out or dialysis, or a combination thereof may be effected for the purpose of recovery and purification. Enzymatic System B is usually contained in the culture filtrate. Accordingly it may be preferable to recover Enzymatic System B from the culture filtrate or to separate it from the culture broth by means of filtration or centrifugation. For example a culture filtrate containing Enzymatic System B can be salted out by the addition of an inorganic salt such as sodium sulphate, ammonium sulphate, or by the addition of an appropriate hydrophilic organic solvent such as methanol, ethanol, normal propanol or acetone. The amount of these salts or hydrophilic organic solvent to be added may vary with the kind of salts or hydrophilic organic solvent. For example, ammonium sulphate is preferably added to the culture filtrate up to 70% saturation. When employing a hydrophilic organic solvent, 50–80% (weight/volume) is preferable. If desired, crude Enzymatic System B obtained may be purified for example by repeated salting out with ammonium sulphate. When ammonium sulphate is employed, the fraction of Enzymatic System B is, in general, obtained at 10–50% saturation.

In the method of this invention, such materials containing Enzymatic System B as culture broth, culture filtrate, extract of culture filtrate with a suitable solvent as well as purified Enzymatic System B can be employed. Hereinafter, Enzymatic System B and materials containing the same are collectively referred to as "Material B." On the other hand, Enzymatic System A is mainly accumulated in the solid portion of the culture broth, e.g., cell bodies or mycelia. Enzymatic System A contains phosphodiesterase capable of hydrolyzing nucleic acid into 5'-nucleotides, and shows a strong effect in hydrolyzing nucleic acid into 5'-nucleotides at a pH value of about 8.0–11.0 and at a temperature of about 30° C. to about 70° C. The accumulated Enzymatic System A can be recovered from the culture broth. Generally known means for extracting enzymes from cell bodies or mycelia can be applied to the recovery of Enzymatic System A. As extraction processes, there are included extraction by the use of a surface active agent, extraction by treatment with supersonic waves, extraction with an aqueous solvent containing a small amount of organic solvent, and extraction involving freeze-drying. Generally-known means for recovering enzymes from their solution can be applied to the recovery of Enzymatic System A from the resultant solution containing Enzymatic System A, for example, precipitation near an isoelectric point, salting out or dialysis, or a combination thereof may be effected for the purpose of recovery or purification. Practically, for example, a solution containing Enzymatic System A can be salted out by the addition of an inorganic salt such as sodium sulphate, ammonium sulphate, or by the addition of an appropriate hydrophilic organic solvent such as methanol, ethanol, normal proapnol or acetone. The amount of these salts or hydrophilic organic solvents may vary with their kinds. For example, ammonium sulphate may be added to a solution containing Enzymatic System A up to an extent of its 70% saturation. When employing a hydrophilic organic solvent, it may be added up to an extent of 80% (weight/volume). Powdery Enzymatic System A then obtained in a crude state may, if desired, be purified by such means, for example, as repeated salting out by the addition of an aqueous solution of the crude ammonium sulfate, whereby the fraction of Enzymatic System A is obtained.

In the method of this invention, such materials containing Enzymatic System A as culture broth, cell bodies, mycelia, the latter two as such or in crushed form, their extracts with suitable solvents as well as Enzymatic System A itself, are employed. Hereinafter, Enzymatic System A and materials containing same are collectively referred to as "Material A."

In the method of this invention, the starting yeast is first contacted with Material A by the use of an aqueous medium. This enzymatic treatment is carried out at a pH value of about 8.0 to about 11.0 and at a temperature ranging from 30° to about 70° C. Practically, it is carried out by adding Material A to an aqueous suspension of yeast and allowing the mixture to stand or stirring the same.

In the above-mentioned enzymatic reaction, it is preferable from an industrial viewpoint to have yeast present in the reaction system at a high concentration from the beginning. However, too large an amount of the substrate contained in the reaction system requires a prolonged period for completing the reaction. Therefore, the initial concentration of the substrate preferably ranges between about 5% to about 30% (weight/volume) relative to the whole reaction system. The period for completing the reaction varies with concentration of the substrate, the amount of Enzymatic System A, reaction temperature, etc. In general, 1 to 20 hours are sufficient for completing the enzymatic reaction.

In the second step, the reaction mixture obtained by the first step as mentioned above is allowed to contact with Material B. This enzymatic treatment is carried out preferably at a pH value of about 2.0 to about 7.0 and at a temperature of from about 30° C. to about 70° C. Practically, it is carried out by adding Material B to the resultant mixture obtained by the first step and keeping the mixture standing or stirring. The period for the reaction varies with concentration of the substrate, the amount of Enzymatic System B, reaction temperature, etc. In general, 1 to 40 hours are sufficient for completion of the reaction.

As mentioned above, the present method is generally carried out by a procedure which comprises first adding Material A to yeast in an aqueous medium and keeping the pH value at about 8.0 to about 11.0, and subsequently adding Material B to the resultant mixture and keeping the pH value at about 2.0 to about 7.0.

The method of this invention can be carried out by such procedure as simultaneous addition of Materials A and B to a suspension of yeast, and keeping the pH value first at about 8.0 to about 11.0 to activate Enzymatic System A and then at about 2.0 to about 7.0 to activate Enzymatic System B. Practically, it is carried out by admixing the culture broth of microorganisms of the genus Trametes with a suspension of yeast, and maintaining the above-mentioned pH conditions.

In this invention, Enzymatic Systems A and B produced from the same strain are preferably employed, but the strains producing Enzymatic System A and Enzymatic System B may be different from each other.

Sometimes Materials A and B are contaminated with phosphomonoesterase capable of hydrolyzing 5'-nucleotides into nucleosides which have no taste. In such a case, phosphomonoesterase inhibitor is added to the reaction system. The inhibitor may for example be phosphates, metal salts (e.g., salts of nickel, cobalt, etc.), arsenate and fluorides. Or Material A or B contaminated with phosphomonoesterase is heated at above 40° C. under an alkaline pH over 8.0, or under an acidic pH below 5.0 to inhibit the action of phosphomonoesterase.

The liquid portion obtained by the enzymatic treatments mentioned above is collected by filtration or centrifugation. The resultant liquor contains mainly various 5'-nucleotides. Among the 5'-nucleotides, there are contained 5'-guanylic acid and 5'-isosinic acid, both of which are capable of enhancing the deliciousness or flavor of foodstuffs. Therefore, the condiments of this invention show remarkable ability of enhancing the deliciousness or flavor of foodstuffs. Thus obtained liquor can be used as condiment without any further treatment. The liquor may be subjected to concentration and/or drying to obtain a concentrated liquid condiment or powdery condiment, as the case may be.

In case the liquor contains some inorganic substances, etc., or has an odor which makes the liquor unsuitable as a condiment, these undesirable matters may be removed by treating with suitable ion-exchange resin.

Thus-obtained condiments of this invention are usable for enhancing the deliciousness or flavor of foodstuffs in food-industries or in household cooking. These condiments are applicable to a wide variety of foodstuffs in kind. Thus, these condiments may be added to enhance the deliciousness or flavor of soups, fermented foods, pasty foods, sauces, salids, vinegared foods, canned foods, pickled vegetables, etc., in the course of their cooking, manufacturing or just before eating.

Following examples serve merely as illustrative of presently preferred embodiments of this invention and are not intended to restrict the scope of this invention.

In the present specification as well as in the following examples, the abbreviations "kg.," "g.," "ml.," "l." and "° C." refer to kilogram(s), gram(s), milliliter(s), liter(s) and degree(s) centigrade, respectively; percentages are weight/volume unless otherwise indicated. And the respective amounts of 5'-nucleotides contained in the resultant condiments are determined by a quantitative analysis method in which a certain weight of condiments are extracted with a cool 5% perchloric acid solution, the resultant extract solution being allowed to pass through a column packed with activated charcoal, the column then being washed with water to remove possible impurities adsorbed, and 5'-nucleotides adsorbed on the column then eluted with a mixture of water, ethanol and ammoniacal water (50:40.9:0.1 by volume ratio), and thus obtained fraction of 5'-nucleotides subjected to the electrophoresis analysis described on "The Biochemical Journal," vol. 52, pp. 594–599, published in 1952.

EXAMPLE 1

*Trametes sanguinea* (L. ex Fr.) Lloyd (ATCC–14622) is inoculated in 120 l. of an aqueous medium of pH 6.0 containing 1% of cornsteep liquor, 6% of sucrose, 3% of soybean cake, 0.2% of ammonium sulfate, 0.2% of potassium dihydrogenphosphate, 0.1% of calcium chloride and 0.1% of magnesium sulfate, followed by incubation under aeration and agitation at 28° C. for 120 hours. 10 l. of resultant culture broth is subjected to filtration to give 7.24 l. of filtrate and 274 g. (dry matter) of cake. The cake is reduced to slurry by a mixer. To the slurry is added 25 l. of aqueous yeast suspension of pH 9.5 containing 6% of dry Torula yeast. The mixture is kept standing at 45° C. for 6 hours, followed by adjustment to pH 3.0 with addition of 10% hydrochloric acid. To the mixture 1.5 l. of the culture filtrate mentioned above is added and the resultant mixture is kept at 45° C. overnight. The resultant mixture is subjected to filtration under reduced pressure to give 26 l. of filtrate. After being adjusted to pH 6.5, the filtrate is concentrated under reduced pressure, followed by spray-drying to give 832 g. of yellowish-brown powdery condiment which contains 23.3 g. of 5'-adenylic acid, 21.6 g. of 5'-guanylic acid, 2.67 g. of 5'-inosinic acid, 13.1 g. of 5'-cytidylic acid and 16.8 g. of 5'-uridylic acid as 5'-nucleotides and has a strong capacity for enhancing the deliciousness or flavor of foodstuffs.

EXAMPLE 2

25 l. of aqueous yeast suspension of pH 9.5 containing 6% of dry Torula yeast is subjected to enzymatic treatments after the manner described in Example 1. Thus-obtained mixture is subjected to filtration under reduced pressure to give 28 l. of filtrate. After being adjusted to pH 6.5, the filtrate is concentrated under reduced pressure to give 1100.2 g. of paste condiment which contains 24% of water and contains 21.1 g. of 5'-adenylic acid, 19.8 g. of 5'-quanylic acid, 2.7 g. of 5'-inosinic acid, 9.3 g. of 5'-cytidylic acid and 14.5 g. of 5'-uridylic acid as 5'-nucleotides.

EXAMPLE 3

*Trametes sanguinea* (L. ex Fr.) Lloyd (ATCC–14622) is inoculated in 120 l. of an aqueous medium of pH 6.0 containing 1% of glucose, 1% of lactose, 7.5% of cornsteep liquor, 0.05% of ammonium sulfate, 0.4% of potassium dihydrogenphosphate, 0.3% of diammonium hydrogenphosphate, 0.5% of potassium chloride and 0.4% of calcium carbonate, followed by incubation under aeration and agitation at 28° C. for 120 hours to obtain 105 l. of culture broth.

To 5 l. of the culture broth is added 300 g. (dry matter) of bakery yeast, followed by adjustment of its pH to 10.0. The mixture is kept standing at 45° C. for 8 hours. After being adjusted to pH 3.0 with addition of 10% hydrochloric acid, 300 ml. of the culture broth mentioned above is added to the mixture. The resultant mixture is kept at 45° C. overnight under mild stirring. Thus-obtained mixture is subjected to filtration to give 8.5 l. of filtrate. After being adjusted to pH 6.5, the filtrate is concentrated under reduced pressure and is subjected to vacuum drying to give 205 g. of powdery condiment which contains 1.8% of 5'-adenylic acid, 1.7% of 5'-guanylic acid, 0.21% of 5'-inosinic acid, 0.92% of 5'-cytydilic acid and 1.4% of 5'-uridylic acid as 5'-nucleotides.

EXAMPLE 4

*Trametes sanguinea* (L. ex Fr.) Lloyd (ATCC–14622) is incubated after the manner described in Example 1 except that the period of the incubation is 72 hours. The resultant culture broth is subjected to filtration to give 10 l. of culture filtrate and 320 g. of cake. The cake is suspended in 5 l. of water, and 150 ml. of octanol is added to the suspension. The suspension is kept at room temperature for 3 hours under intermittent stirring, followed by filtration to give 4.4 l. of filtrate. To the filtrate is added ethanol to make the concentration of the ethanol 80% relative to the total volume to yield precipitates. The precipitates are collected by filtration, followed by drying under reduced pressure at room temperature to obtain 16 g. of crude powder of enzymatic composition which is referred to as "Enzymatic Powder A" in the present invention. On the other hand, ethanol is added to the culture filtrate mentioned above to make its concentration 80% to yield precipitates. The precipitates collected are dried under reduced pressure at 24° C. to give 181 g. of crude powder of enzymatic composition which is referred to as "Enzymatic Powder B" in the present invention.

To 10 l. of the aqueous suspension of pH 9.5 containing 6% of dry Torula yeast is added 16 g. of the "Enzymatic Powder A," then the suspension is kept at 45° C. for 8 hours under mild stirring. After the mixture is adjusted to pH 3.0 with addition of 10% hydrochloric acid, 10 g. of the "Enzymatic Powder B" is added thereto. The resultant mixture is kept at 45° C. for 20 hours under mild stirring. After being adjusted to pH 6.5, thus-obtained mixture is filtered to give 14 l. of filtrate. The filtrate is concentrated under reduced pressure, followed by vacuum drying to yield 492 g. of solid condiment which contains 8.4 g. of 5'-adenylic acid, 7.8 g. of 5'-guanylic acid, 0.93 g. of 5'-inosinic acid, 4.4 g. of 5'-cytydlic acid and 5.3 g. of 5'-uridylic acid.

EXAMPLE 5

*Trametes cinnabarina* (Jacq.) Fr. (ATCC–14623) is inoculated on 500 ml. of an aqueous medium of pH 6.0 containing 2% of glucose, 5% of cornsteep liquor, 0.1% of ammonium sulfate, 0.5% of potassium dihydrogen phosphate, 0.5% of calcium chloride, 0.5% of calcium carbonate and 0.05% of soy bean oil, followed by incubation under shaking at 28° C. for 6 days. To 100 ml. of thus-obtained culture broth is added normal toluene so as to make its concentration 2.0% and the mass sufficiently mixed. The mixture is subjected to supersonic waves treatment (19 kilocycles) for 10 minutes to obtain an enzymatic solution (referred to as "the Enzymatic Solution A"). On the other hand, 200 ml. of the above-mentioned culture broth is adjusted to pH 8.0 with 10% sodium hydroxide solution and heated at 50° C. for 1 minute, followed by rapidly cooling to get another enzymatic solution (referred to as "the Enzymatic Solution B").

500 ml. of aqueous yeast suspension containing 8% (dry matter) of bakery yeast is heated at 80° C. for 1 minute, then is rapidly cooled, followed by adjustment to pH 8.5 with 10% solution hydroxide solution. The suspension is mixed with 100 ml. of the Enzymatic Solution A, followed by keeping the mixture at 40° C. for 8 hours. Resultant mixture is heated at 50° C. for 1 minute, then rapidly cooled to 45° C. After being adjusted to pH 4.0 with 10% hydrochloric acid solution, the mixture is admixed with 100 ml. of the Enzymatic Solution B, followed by keeping the mixture at 40° C. overnight under mild stirring. After the resultant mixture has been neutralized, 30 g. of diatomaceous earth is added thereto. The mixture is subjected to filtration under reduced pressure. The resultant filtrate is concentrated under reduced pressure to give 38.4 g. of paste condiment containing 25% (weight/weight) of water. The condiment contains 0.18 g. of 5'-inosinic acid, 0.33 g. of 5'-guanylic acid, 0.47 g. of 5'-uridylic acid, 0.42 g. of 5'-adenylic acid and 0.38 g. of 5'-cytidylic acid as 5'-nucleotides. Solution obtained by dissolving the condiment into water shows a strong ability of enhancing the deliciousness or flavor of foodstuffs.

EXAMPLE 6

*Trametes sanguinea* (L. ex Fr.) Lloyd (ATCC–14622) is inoculated on 100 ml. of an aqueous medium of pH 7.0 containing 1% of glucose, 1% of lactose, 7.5% of cornsteep liquor, 0.05% of ammonium sulfate, 0.4% of potassium dihydrogen phosphate, 0.3% of diammonium hydrogen phosphate, 0.5% of potassium chloride, 0.5% of calcium carbonate, 0.055% of soy bean oil and 0.042% of concentrated sulfuric acid, followed by incubation under shaking at 28° C. for 5 days. To thus-obtained culture broth is added methanol so as to make its final concentration 60%, and then the mixture is kept standing for a minute to yield precipitates. The precipitates are collected by filtration under reduced pressure. After being air-dried, the precipitates are crushed to give faint-brown powder. 3 g. of the above-mentioned enzymatic powder is added to 500 ml. of an aqueous yeast suspension of pH 8.8 containing 8% of dry Torula yeast, followed by keeping at 40° C. with intermittent shaking for 8 hours. The resultant mass is heated at 80° C. for 1 minute, then rapidly cooled to 40° C. After the mixture is adjusted to pH 4.0 with 10% hydrochloric acid, 100 ml. of the Enzymatic Solution B prepared after the manner decribed in Example 5 is added thereto, followed by keeping at 40° C. overnight. The resultant product is admixed with 25 g. of diatomaceous earth and subjected to filtration under reduced pressure. The resultant filtrate is concentrated under reduced pressure to give solid condiment containing 0.21 g. of 5'-inosinic acid, 0.8 g. of 5'-adenylic acid, 0.74 g. of 5'-guanylic acid, 0.95 g. of 5'-uridylic acid and 0.76 g. of 5'-cytidylic acid as 5'-nucleotides.

Having thus disclosed the invention, what is claimed is:

1. A method for preparing from yeast a condiment containing 5'-nucleotides, which comprises treating yeast first with an enzymatic system produced by the incubation of a microorganism of the genus Trametes and capable of hydrolyzing nucleic acid into 5'-nucleotides in an aqueous medium at a pH value of about 8.0 to about 11.0; and subsequently with a second enzymatic system produced by the incubation of a microorganism of the genus Trametes and capable of solubilizing organic materials in an aqueous medium at pH value of about 2.5 to about 7.0.

2. A method according to claim 1, where the enzymatic treatment is carried out contacting the yeast with the culture broth of a microorganism of the genus Trametes in an aqueous medium first at a pH value of about 8.0 to about 11.0 for a period of time allowing a first enzymatic reaction to substantially take place, and subsequently at a pH value of about 2.5 to about 7.0 for a period of time enabling a second enzymatic reaction to substantially take place.

3. A method according to claim 1, where the enzymatic treatment is carried out by contacting the yeast first with the solid portion of the culture broth from the first incubation, in an aqueous medium at a pH value of about 8.0 to about 11.0 for a period of time allowing the enzymatic reaction to substantially take place, and subsequently adjusting the pH value of the aqueous medium to about 2.5 to about 7.0 for a period of time enabling a second enzymatic reaction to substantially take place.

4. A method according to claim 1, wherein the enzymatic treatment is carried out by allowing yeast to contact with the culture broth of a microorganism of the genus Trametes in an aqueous medium first at a pH value of about 8.0 to about 11.0 for at least 1 hour, and subsequently at a pH value of about 2.5 to about 7.0 for at least 1 hour.

5. A method according to claim 1, wherein the enzymatic treatment is carried out by allowing yeast to contact first with the solid portion of the culture broth of a microorganism of the genus Trametes in an aqueous medium at a pH value of about 8.0 to about 11.0 for at least 1 hour, and subsequently with the culture filtrate of a microorganism of the genus Trametes in an aqueous medium at a pH value of about 2.5 to about 7.0 for at least 1 hour.

6. A method according to claim 1, wherein the microorganism is *Trametes sanguinea* (L. ex Fr.) Lloyd.

7. A method according to claim 1, wherein the microorganism is *Trametes cinnabarina* (Jacq.) Fr.

References Cited

UNITED STATES PATENTS

| | | |
|---|---|---|
| 3,104,171 | 9/1963 | Sakaguchi et al. |
| 3,120,511 | 2/1964 | Tanaka et al. |

FOREIGN PATENTS

| | | |
|---|---|---|
| 632,791 | 12/1961 | Canada. |
| 651,834 | 11/1962 | Canada. |

ALVIN E. TANENHOLTZ, *Primary Examiner.*

U.S. Cl. X.R.

99—14; 195—28